(12) United States Patent
Gendou et al.

(10) Patent No.: US 7,360,677 B2
(45) Date of Patent: *Apr. 22, 2008

(54) SPOT JOINING METHOD OF METAL MEMBERS AND SPOT JOINING APPARATUS OF METAL MEMBERS

(75) Inventors: Toshiyuki Gendou, Hiroshima (JP); Kenji Takase, Hiroshima (JP); Katsuya Nishiguchi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 143 days.

This patent is subject to a terminal disclaimer.

(21) Appl. No.: 11/000,063

(22) Filed: Dec. 1, 2004

(65) Prior Publication Data
US 2005/0120535 A1 Jun. 9, 2005

(30) Foreign Application Priority Data
Dec. 5, 2003 (JP) ............................. 2003-406709

(51) Int. Cl.
*B23K 20/12* (2006.01)
(52) U.S. Cl. ................... 228/112.1; 228/2.1; 228/254
(58) Field of Classification Search ................ 228/2.1, 228/112.1
See application file for complete search history.

(56) References Cited

U.S. PATENT DOCUMENTS

| | | | | |
|---|---|---|---|---|
| 6,050,475 A * | 4/2000 | Kinton et al. | ............ | 228/112.1 |
| 6,053,391 A * | 4/2000 | Heideman et al. | ............ | 228/2.1 |
| 6,832,713 B2 * | 12/2004 | Kano et al. | ................ | 228/2.1 |
| 6,926,970 B2 * | 8/2005 | James et al. | ................ | 428/615 |
| 2002/0158109 A1 * | 10/2002 | Gendoh et al. | .......... | 228/112.1 |
| 2003/0029903 A1 * | 2/2003 | Kashiki et al. | .......... | 228/112.1 |
| 2003/0141343 A1 * | 7/2003 | Murakami | ................ | 228/112.1 |
| 2004/0079787 A1 * | 4/2004 | Okamoto et al. | ......... | 228/112.1 |
| 2004/0195290 A1 * | 10/2004 | Nagao | ........................ | 228/2.1 |
| 2005/0006441 A1 * | 1/2005 | Adams et al. | ........... | 228/114.5 |
| 2005/0029331 A1 * | 2/2005 | Kano et al. | .............. | 228/112.1 |
| 2005/0035180 A1 * | 2/2005 | Nishiguchi et al. | ...... | 228/112.1 |
| 2005/0103824 A1 * | 5/2005 | Waldron et al. | ......... | 228/112.1 |

FOREIGN PATENT DOCUMENTS

JP 11-010363 1/1999

(Continued)

OTHER PUBLICATIONS

Office Action in corresponding Japanese Patent Application No. 2003-406709 dated Sep. 25, 2007, pp. 1-2.

*Primary Examiner*—Kiley Stoner
(74) *Attorney, Agent, or Firm*—Donald R. Studebaker; Nixon Peabody LLP

(57) ABSTRACT

In a spot joining method and apparatus, pressing force of a rotating tool is maintained at a first pressing force, the frictional heat due to the rotation of the rotating tool is generated on a surface of an aluminum plate, and the aluminum plate is softened by this frictional heat, so as to ensure the centering of a pin portion of the rotating tool. Thus, even if the pin of the rotating tool is short, a stable joining position can be obtained, so that the aluminum material can be prevented from accumulating on the rotating tool, the appearance of joining surfaces can be prevented from deteriorating, and the sufficient joining strength can be obtained.

4 Claims, 13 Drawing Sheets

FOREIGN PATENT DOCUMENTS

| | | |
|---|---|---|
| JP | 2000-246465 | 9/2000 |
| JP | 2002-045980 | 2/2002 |
| JP | 2002-192358 | 7/2002 |
| JP | 2003-117668 | 4/2003 |
| JP | 2003-251472 | 9/2003 |
| JP | 2003-275876 | 9/2003 |

* cited by examiner

| Sample No. | Upper Plate Material | Upper Plate Thickness | Lower Plate Material | Lower Plate Thickness | First Stage Rotation Speed | First Stage Pressing Force | First Stage Pressing Time | Second Stage Rotation Speed | Second Stage Pressing Force | Second Stage Pressing Time | Joining Results |
|---|---|---|---|---|---|---|---|---|---|---|---|
| 1 | 6000 base Alloy | 1.0 | Zinc Plating Steel Plate | 1.0 | 3000 | 2.94 | 0.4 | 3500 | 1.96 | 0.1 | Aluminum accumulated, Not joined |
| 2 | 6000 base Alloy | 1.0 | Zinc Plating Steel Plate | 1.0 | 3000 | 2.94 | 0.5 | 3500 | 1.96 | 0.1 | Aluminum accumulated, Joined but not enough |
| 3 | 6000 base Alloy | 1.0 | Zinc Plating Steel Plate | 1.0 | 3500 | 0.98 | 2.5 | 3500 | 2.45 | 2.5 | Properly Jointed |
| 4 | 6000 base Alloy | 1.0 | Zinc Plating Steel Plate | 1.0 | 3500 | 0.98 | 0.5 | 3500 | 2.45 | 2.5 | Properly Jointed |
| 5 | 6000 base Alloy | 1.0 | Zinc Plating Steel Plate | 1.0 | 3500 | 0.98 | 1.0 | 3500 | 2.45 | 2.5 | Properly Jointed |
| 6 | 6000 base Alloy | 1.0 | Zinc Plating Steel Plate | 1.0 | 3500 | 0.98 | 1.5 | 3500 | 2.45 | 2.5 | Properly Jointed |
| 7 | 6000 base Alloy | 1.0 | Zinc Plating Steel Plate | 1.0 | 3500 | 0.98 | 2.0 | 3500 | 2.45 | 2.5 | Properly Jointed |
| 8 | 6000 base Alloy | 1.0 | Zinc Plating Steel Plate | 1.0 | 3500 | 0.98 | 2.5 | 3500 | 2.45 | 0.5 | Properly Jointed |
| 9 | 6000 base Alloy | 1.0 | Zinc Plating Steel Plate | 1.0 | 3500 | 0.98 | 2.5 | 3500 | 2.45 | 1.0 | Properly Jointed |
| 10 | 6000 base Alloy | 1.0 | Zinc Plating Steel Plate | 1.0 | 3500 | 0.98 | 2.5 | 3500 | 2.45 | 1.5 | Properly Jointed |
| 11 | 6000 base Alloy | 1.0 | Zinc Plating Steel Plate | 1.0 | 3500 | 0.98 | 2.5 | 3500 | 2.45 | 2.0 | Properly Jointed |

FIG. 12

| Sample No. | Upper Plate | | Lower Plate | | Joining Conditions | | | | | | | | | Joining Results |
|---|---|---|---|---|---|---|---|---|---|---|---|---|---|---|
| | | | | | First Stage | | | Second Stage | | | Third Stage | | | |
| | Material | Thickness | Material | Thickness | Rotation Speed | Pressing Force | Pressing Time | Rotation Speed | Pressing Force | Pressing Time | Rotation Speed | Pressing Force | Pressing Time | |
| 1 | 6000 base Alloy | 0.8 | Zinc Plating Steel Plate | 0.8 | 3000 | 0.49 | 2.0 | 3000 | 0.74 | 2.0 | 3000 | 0.98 | 0.5 | Properly Jointed |
| 2 | | | | | | | 2.5 | | | | | | | |

FIG. 13

SPOT JOINING METHOD OF METAL MEMBERS AND SPOT JOINING APPARATUS OF METAL MEMBERS

BACKGROUND OF THE INVENTION

The present invention relates to a spot joining method of metal members and a spot joining apparatus of metal members, and more specifically to a spot joining method and a spot joining apparatus in which different kinds of metal members are joined by a frictional joining method.

Recently, some vehicle bodies made of light metals, such as aluminum, have been manufactured aiming at lightweight vehicles. Light metals such as aluminum, however, have somewhat difficulties in joining by an electric resistance welding. Accordingly, there were problems that their joining methods might be limited and manufacturing costs might increase.

Meanwhile, a frictional agitation joining apparatus disclosed in Japanese Patent Laid-Open Publication No. 2003-117668 has been proposed. In this frictional agitation joining apparatus, a rotator having a pin at its tip is rotated at a high speed and then pressed against a work (an aluminum plate). The work is softened and agitated thereby, and a spot joining can be applied to the work.

Herein, manufacturing costs such as coolant water, welding current can be reduced properly compared with conventional spot resistance welding. The above-described patent publication also discloses a changing of a rotational speed and a pressing force, aiming at useful facilities for a mass production.

Meanwhile, although the vehicle body being made of aluminum members or the like is effective in manufacturing lightweight vehicles, steel members or the like may be used at some portions which need higher rigidity from viewpoints of strength or costs. In this case, different kinds of metal members, such as an aluminum member and a steel member, need to be joined to each other to manufacture the vehicle body.

Herein, although the above-described frictional agitation joining apparatus may be available for joining different kinds of metal members, it is not easy to agitate, especially, the aluminum member and the steel member properly, which have different melting points from each other. Accordingly, some countermeasures for this has been needed.

Herein, another type of joining method may be adopted, in which only the aluminum member is agitated by use of friction, and both new uncovered surfaces of the steel and aluminum members are joined via a so-called solid state joining. This solid state joining is a method of joining metal members in solid state without melting materials of the metal members, in which atomic diffusions occur around joining portions and the metal members are joined to each other with atoms of members being mixed with each other. Here, since an oxidation film is generally created on a surface of the steel member, a sufficient joining strength may not be obtained properly without any useful measures.

The applicant previously filed a U.S. patent application (Ser. No. 10/863,216) as to a method and the like of improving joining strength of such a solid state joining by eliminating the inappropriate oxidation film properly. This patent application has proposed the method comprising the steps of preventing the oxidation film from existing on the surface of the steel member by previously forming a zinc plating layer on the surface of steel member, pushing away the zinc plating layer out of joining portions by the frictional agitation of a rotating tool, and contacting both new uncovered surfaces of the members directly, thereby improving joining strength of the solid state joining. According to this method, the joining strength of solid state joining of different kinds of metal members can be improved properly.

However, there may be another difficulty in adopting this proposed method. Namely, the pin provided at the rotating tool is configured so as to be short enough to agitate only the aluminum member properly without reaching the steel member. In this case, however, such a short pin may provide somewhat difficulty in positioning the rotating pin at a specified portion stably, resulting in an unstable joining position. This unstable joining position may cause an improper joining. As a result, there may occur other problems that aluminum materials are accumulated on the rotating tool, an appearance of joining surfaces deteriorates, the sufficient joining strength is not obtained, and the like.

SUMMARY OF THE INVENTION

The present invention has been devised in view of the above-described problems. An object to of the present invention to provide a spot joining method of metal members and a spot joining apparatus of metal members, in which different kinds of metal members are joined by a frictional agitation, which can provide such a stable joining position, even if the pin of the rotating tool is short, that the aluminum materials can be prevented from being accumulated on the rotating tool, the appearance of joining surfaces can be prevented from deteriorating, and the sufficient joining strength can be obtained.

According to the present invention, there is provided a spot joining method of metal members, in which different kinds of metal members are joined by at least partly lapping the metal members, comprising the steps of lapping a first metal member and a second metal member, a melting point of the second metal member being higher than that of the first metal member, placing a rotating tool under a rotation on an outer surface of the first metal member by making the rotating tool approach in a rotational axis direction, the rotating tool comprising a pin portion projecting outward at a center thereof, pressing the rotational tool against the first metal member with a pressing force, whereby the first metal member can be softened and made in a plastic flow state by a frictional heat generated by the rotation of the rotating tool and spot faces of the first and second metal members are joined thereby, wherein the above-described step of pressing the rotational tool against the first metal member comprises at least an initial step of pressing the rotational tool with a relatively small pressing force enough to generate a frictional heat which can soften at least the outer surface of the first metal member, and a subsequent step of pressing the rotational tool with a relatively large pressing force enough to make the first metal member in the plastic flow state so that the spot faces of the first and second metal members can be joined eventually.

Accordingly, since the pressing force of the rotational tool is controlled at the relatively small one in an initial joining stage, at least the outer surface of the first metal member can be softened by the frictional heat and a rotational center of the rotating tool can be stabilized properly thereby. Meanwhile, the pressing force of the rotating tool is increased in a subsequent joining stage, the first metal member can be made in the plastic flow state so that the first and second metal members can be joined eventually.

Herein, the pressing force changed in stages may have two stages, three stages or even more. Also, force differences of the changed pressing force may be set appropriately in consideration of providing properly the above-described stable rotational center of the rotating tool and plastic-flow-state joining of metal members.

According to a preferred embodiment, the rotating tool further comprises a ring-shaped concave which is formed at a shoulder portion around the pin portion.

Accordingly, the first metal member softened by the frictional heat generated at the pin portion is apt to remain in the concave formed at the shoulder portion in the plastic flow state, and it can be properly prevented from flowing out from the joining portion. Therefore, the first metal member can be pressed surely even though the pressing force is increased in stages. As a result, the first and second metal members can be joined properly and surely.

According to another preferred embodiment, the above-described ring-shaped concave comprises a slant bottom face such that a depth becomes deeper gradually inwardly.

Accordingly, the first metal member in the plastic flow state is directed toward the center of the rotating tool by the pressing force. Thus, the pressing force against the first metal member can be surely increased. As a result, the first and second metal members can be joined properly and surely.

According to another preferred embodiment, the above-described step of pressing the rotational tool against the first metal member is substantially comprised of two steps of the above-described initial and subsequent steps.

Accordingly, the pressing force increased in stages has two stages, i.e., a first stage where at least the outer surface of the first metal member is softened by the frictional heat, and a second stage where the first metal member is made in the plastic flow state Thus, these two stages can be provided securely. Accordingly, the above-described stable rotational center of the rotating tool and proper plastic-flow-state joining of metal members can be attained securely. As a result, the first and second metal members can be joined properly and surely.

According to another preferred embodiment, the first metal member is an aluminum plate and the second metal member is a steel plate, whereby spot faces of the both palates are joined in a solid state.

Accordingly, in a case where the aluminum plate and the steel plate are selected and these plates are joined in the solid state, the stable joining position of them can be also provided. Thus, even in a case where the aluminum plate requires a shorter pin portion, the solid state joining of the aluminum plate and the steel plate can be attained surely.

According to the present invention, there is provided a spot joining apparatus of metal members, in which a first metal member and a second metal member are joined by at least partly lapping the metal members and by use of a frictional heat generated by a rotation of a rotating tool having a pin portion projecting outward at a center, a melting point of the second metal member being higher than that of the first metal member, comprising a rotation applying device operative to apply a rotation to the rotating tool, a pressure applying device operative to apply a pressing force to the rotating tool in a rotational axis direction, and a pressing-force control device operative to change the pressing force of the pressure applying device from an initial pressing force which is relatively small enough to generate a frictional heat which can soften at least an outer surface of the first metal member to a subsequent pressing force which is relatively large enough to make the first metal member in the plastic flow state so that the first and second metal members can be joined.

Accordingly, the pressing force is properly increased in stages by the pressing-force control device. Thus, in the initial joining stage, at least the outer surface of the first metal member can be softened by the frictional heat and the rotational center of the rotating tool can be stabilized properly with the initial pressing force which is relatively small. Meanwhile, in the subsequent joining stage, the first metal member can be made properly in the plastic flow state with the increased pressing force so that the first and second metal members can be joined properly.

According to another preferred embodiment, the rotating tool further comprises the ring-shaped concave which is formed at the shoulder portion around the pin portion in the above-described spot joining apparatus.

Accordingly, the first metal member softened by the frictional heat generated at the pin portion is apt to remain in the concave formed at the shoulder portion in the plastic flow state, and it can be properly prevented from flowing out from the joining portion. Therefore, the first metal member can be pressed surely even though the pressing force is increased in stages. As a result, the first and second metal members can be joined properly and surely.

According to another preferred embodiment, the ring-shaped concave comprises the slant bottom face such that the depth becomes deeper gradually inwardly in the above-described spot joining apparatus.

Accordingly, the first metal member in the plastic flow state is directed toward the center of the rotating tool by the pressing force. Thus, the pressing force against the first metal member can be surely increased. As a result, the first and second metal members can be joined properly and surely.

Other features, aspects and advantages of the present invention will become apparent from the following description which refers to the accompanying drawings.

BRIEF DESCRIPTION OF THE DRAWINGS

FIG. 12 is a chart of experimental data according to a two-stage pressing-force change.

FIG. 13 is a chart of experimental data according to a three-stage pressing-force change.

DETAILED DESCRIPTION OF THE INVENTION

Hereinafter, preferred embodiments of the present invention will be described with reference to the accompanying drawings.

Figure 1:
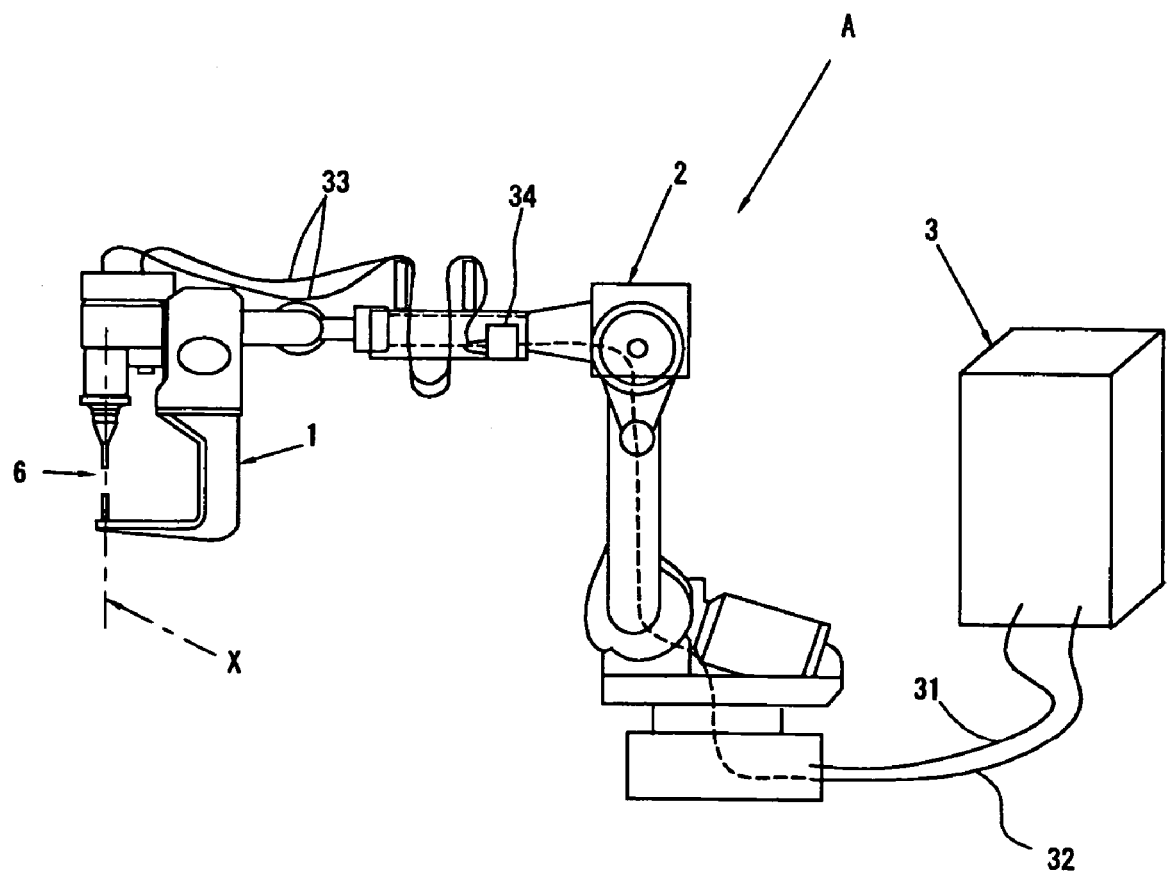
FIG. 1 is a schematic diagram illustrating a structure of a joining apparatus according to an embodiment.

FIG. 1 illustrates schematically a structure of a joining apparatus A according to an embodiment, in which an aluminum plate W1 made of an aluminum alloy (a Japanese Industrial Standard 6000 based aluminum-alloy plate) and a steel plate W2 (a zinc plating steel plate) are used as metal members which constitutes, for example, a vehicle body or the like, and the both plates are partly lapped and joined to each other.

The joining apparatus A includes a robot 2, a joining gun 1 attached to an arm tip of the robot, and a control unit 3 to control these.

The robot 2 may be configured of, for example, a six-axis multiple-articulated type of robot which has been used widely, which has function of positioning the joining gun 1 at a joining portion between the aluminum plate W1 and the steel plate W2.

Figure 2:
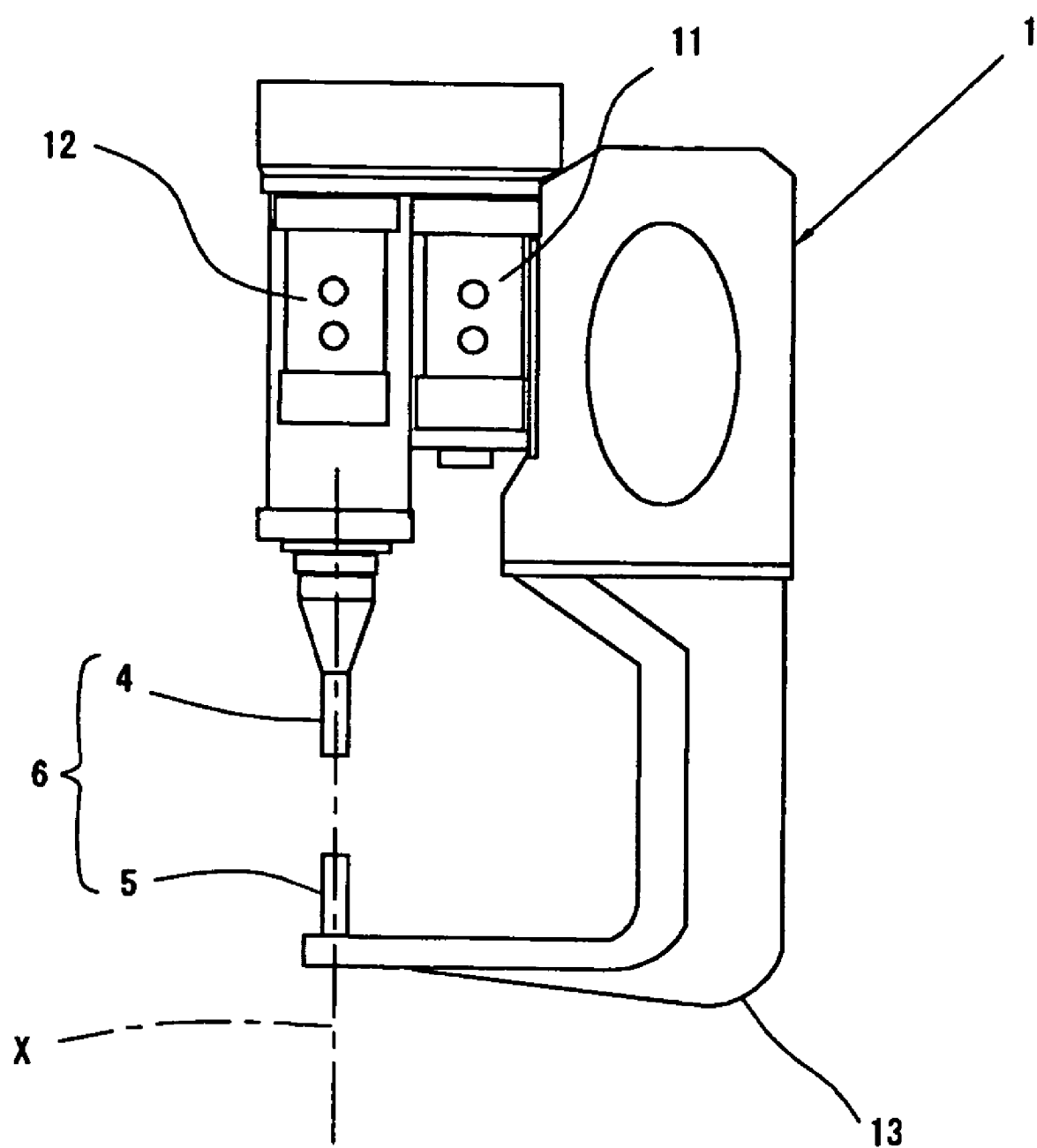
FIG. 2 is a schematic diagram illustrating a structure of a joining gun according to the embodiment.

The joining gun 1 includes a rotating toll 4 and a receiving toll 5 as a joining tool 6 thereof for joining the aluminum plate W1 and the steel plate W2, as illustrated in FIG. 2. The rotating toll 4 is disposed on a joining axis X, which is controlled by a pressing axis motor 11 so as to move up and down for pressing along the joining axis X and a rotating axis motor 12 so as to rotate around the joining axis X. The rotating axis motor 12 may be configured of an induction motor or a servomotor, while the pressing axis motor 11 may be configured of a servomotor.

The receiving member 5 is disposed so as to face to the rotating tool 4 and be maintained in its specified position by a substantially L-shaped arm 13. The receiving member 5 is attached at a tip of the arm 13. Herein, the rotating tool 4 and the receiving member 5 are detachably attached to the joining gun 1.

Figure 3:
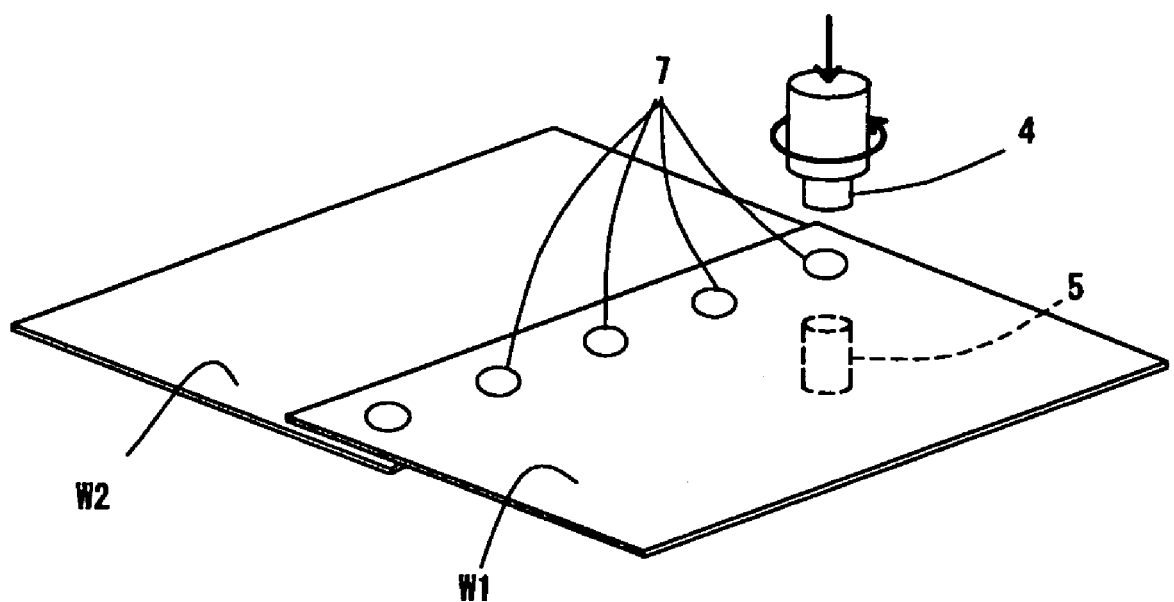
FIG. 3 is a perspective view illustrating a joining tool and metal members.
Figure 4:
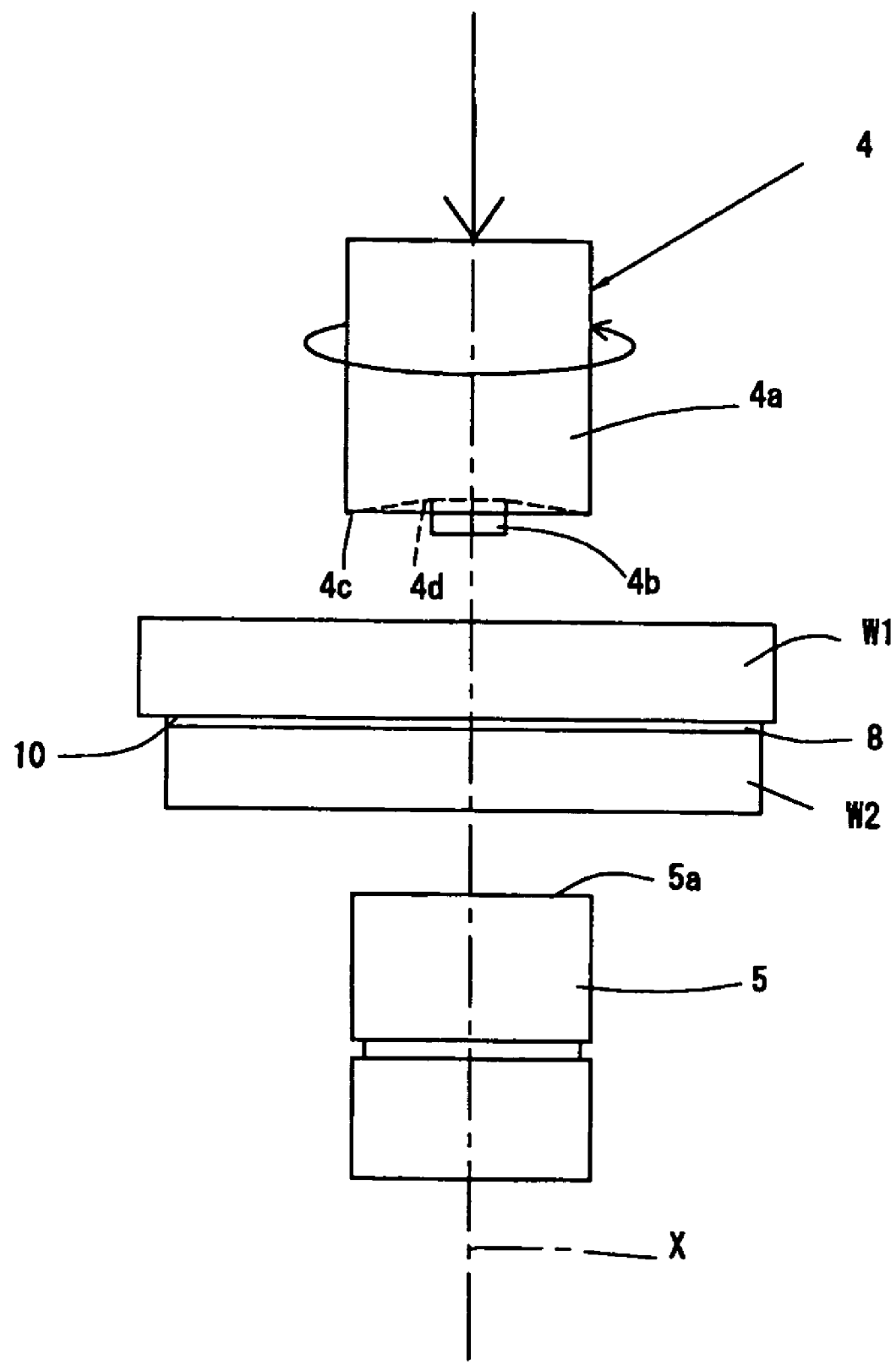
FIG. 4 is a side view illustrating the joining tool and the metal members.
Figure 5:
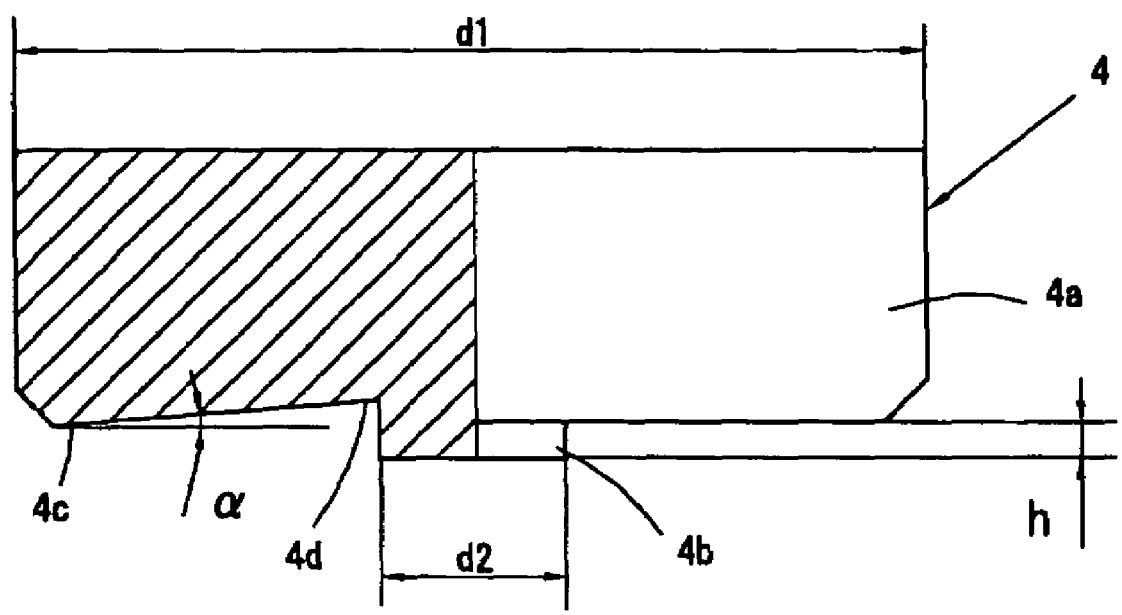
FIG. 5 is an enlarged view illustrating a tip of a rotating tool.

The rotating toll 4 and the receiving member 5 of the joining gun 1 will be specifically described referring to FIGS. 3 through 5.

The rotating toll 4 includes a body portion 4a and a pin portion 4b for the purpose of centering (positioning function, anti-slippage function), which are formed integrally. The body portion 4a is of substantially cylindrical shape, and is so located that its axis can be on the above-described joining axis X. In addition, there is provided a concave portion 4d at an end surface (a shoulder portion) 4c of a tip of the body portion 4a, which is relatively shallow in total. The concave 4d comprises a slant bottom face such that its depth becomes deeper gradually inwardly.

The pin portion 4b is also so located that its axis can be on the axis of the body portion 4a (joining axis), and the pin portion 4b projects from the tip end surface of the body portion 4a with its smaller diameter than that of the body portion 4a and with its flat end surface.

Specifically, as illustrated in FIG. 5, a shoulder diameter d1 which is a diameter of the body portion 4a is set at 10.6 mm, a diameter d2 of the pin portion 4b is set at 2.4 mm, a length (projecting length) h of the pin portion 4b is set at 0.4 mm, and a slant angle α of the concave 4d is set at 5 degrees.

The receiving member 5 is also of a substantially cylindrical shape, which has approximately the same diameter as the body portion 4a of the above-described rotating tool 4, and its end face 5a is formed as a flat face.

The rotating tool 4 and receiving member 5 are configured as described above, and the aluminum plate W1 and steel plate W2 are joined at a joining position 7 by at least partly lapping them (see FIG. 3).

The above-described control unit 3, as shown in FIG. 1, is coupled to the robot 2 via a harness 31 and also coupled to the joining gun 1 via a harness 33, a junction box 34 and a harness 32. The control unit 3 is configured so as to perform a synchronous eight-axis control including the six-axis control for the robot and additionally two-axis controls for the rotating axis motor 12 and the pressing axis motor 11 of the joining gun 1.

Figure 6:
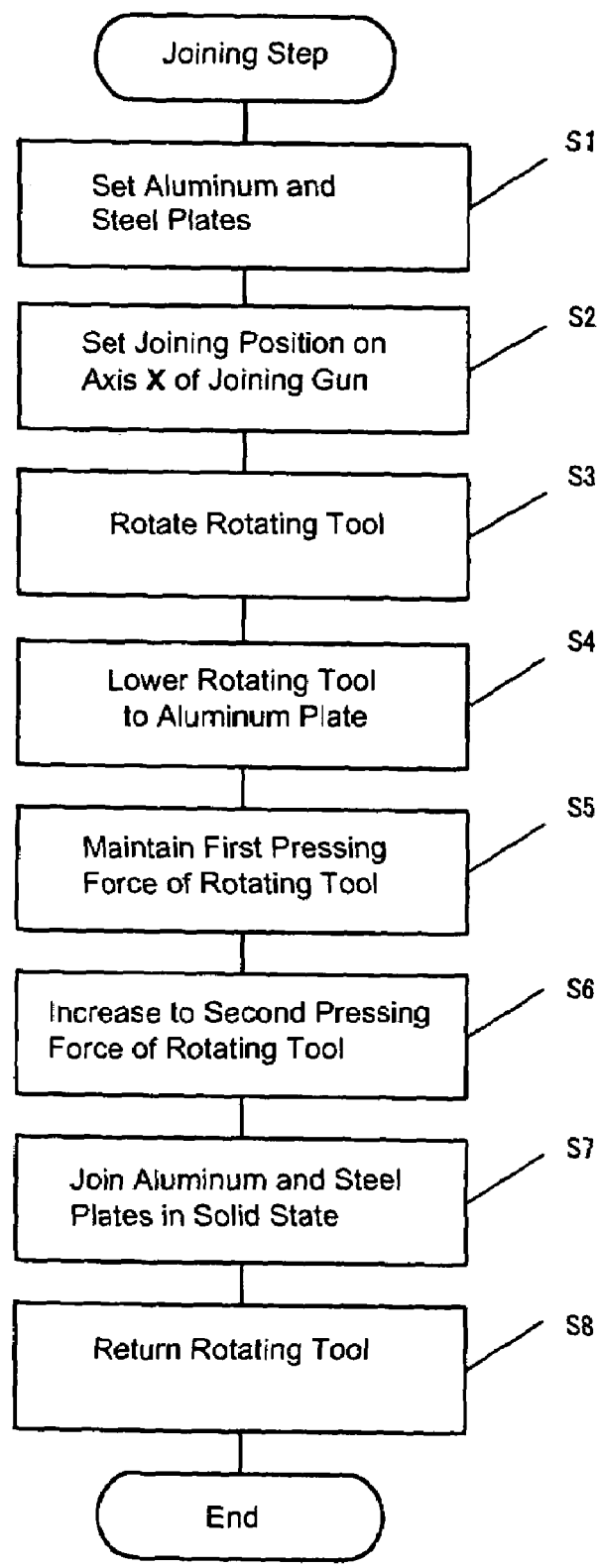
FIG. 6 is a flowchart of joining steps.

Next, the joining method of metal members using the above-described joining apparatus A will be specifically described referring to a flowchart of FIG. 6. This joining method can be applied to different kinds of metal members, particularly to metal members having different degrees of softness. In the present embodiment, the aluminum plate W1 and the steel plate W2 are used as the metal members to be joined.

Herein, a zinc plating layer 8 (or a zinc-alloy plating) has been previously formed on a joining face of the steel plate W2 to prevent any oxidation film from being created on the joining face (see FIG. 4). Meanwhile, any particular treatments to form such an anti-oxidation film has not been applied to the aluminum plate W1. Accordingly, only an oxidation film which will be created under a normal condition is formed on a joining face of on the aluminum plate W1.

First, the aluminum plate W1 and steel plate W2 are fixed to specified positions in specified states respectively in step S1. This fixing is attained by setting these plates W1 and W2 at tools (not illustrated) fixed to a specified position in a working area of the robot 2. Accordingly, respective joining faces of these plates W1 and W2 are lapped, and the above-described zinc plating layer 8 is provided so as to be located between these joining faces.

In a subsequent step S2, the joining position 7 of the aluminum plate W1 and steel plate W2 is set on the joining axis X of the joining gun 1 by moving the joining gun 2 with the robot 2. Namely, the joining gun 1 is moved in such a manner that the receiving member 5 faces the steel plate W2 and the joining position 7 is located between the receiving member 5 and the rotating tool 4, so that the joining position 7 of the plates can be located on the joining axis X of the joining gun 1. Then, the joining gun 1 is moved upward until the end face of the receiving tool 5 contacts the steel plate W2.

Then, the rotating tool 4 is rotated by the rotating axis motor 12 in step S3. The rotational speed is set, for example, at approximately 3500 rpm.

Subsequently, in step S4, the rotating tool 4 under a rotation is lowered by the pressing axis motor 11 until its contacting the aluminum plate W1, and then the aluminum plate W1 and steel plate W2 are held by the pin portion 4b and the receiving tool 5 of the rotating tool 4. Accordingly, the rotating tool 4 is located in its right position through the pin portion 4b contacting the aluminum plate W1 first.

Next, the pressing force of the rotating tool 4 is maintained at a first pressing force (a relatively small pressing force) in step S5. Namely, in its initial step, maintaining the pressing force of the rotating tool at the first pressing force generates a frictional heat H on the outer surface of the aluminum plate W1 by the rotation of the rotating tool 4. As a result, at least the outer face of the aluminum plate W1 can be softened by this frictional heat (see FIG. 9). Herein, softening the outer surface of the aluminum plate W1 can provide proper centering of the rotating tool 4 by the pin portion 4b surely, and the rotational center of the rotating tool 4 can be stabilized properly thereby.

In a subsequent step S6, the pressing force of the rotating tool 4 is increased up to a second pressing force (a relatively large pressing force). The rotating tool 4 goes into the softened aluminum plate W1 under this increasing pressing force. Herein, some part of aluminum material receiving a high pressure from the rotating tool 4 is sheared by the rotation of the rotating tool 4. And, the zinc plating (the zinc plating layer 8), which has been softened by the frictional heat H, is diffused into this sheared portion (see FIG. 10).

Herein, the pressing force by the rotating tool 4 causes a plastic deformation of the aluminum plate W1, and the sheared portion expands outwardly. At the same time, the zinc plating layer 8 remaining at a boundary surface between the aluminum plate W1 and the steel plate W2 is also pushed away outwardly. Herein, the oxidation layer on the surface of the aluminum plate W1 is also destroyed under the above-described plastic deformation (plastic flow), and accordingly a new uncovered surface (a surface of aluminum material itself not being covered by the oxidation layer) is exposed on the aluminum plate W1.

Next, the aluminum plate W1 and the steel plate W2 are joined in the solid state in step S7. Namely, since part of the zinc plating layer 8 on the steel plate W2 has been diffused into the aluminum and the rest of that has been pushed away outwardly, at a area where the zinc plating layer 8 is gone and the oxidation layer has been destroyed, both new uncovered surfaces of the aluminum and steel plates W1 and W2 are joined via a direct contact. Also, at a peripheral area with the zinc plating layer 8 existing, these two plates W1 and W2 are joined via a zinc-aluminum-iron compound 9 (see FIG. 10).

Finally, the rotating tool 4 under rotation is returned back in step S8 and the joining step is finished.

Figure 7:
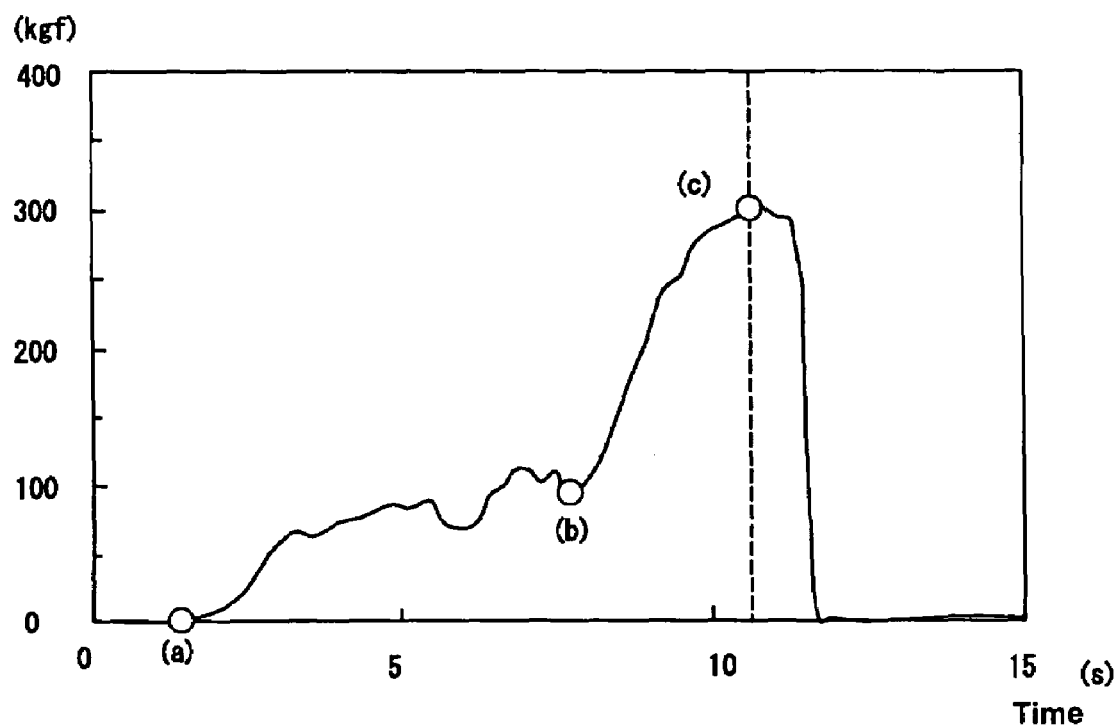
FIG. 7 is a graph illustrating a change in a pressing force by the rotating tool with respect to time.
Figure 8:
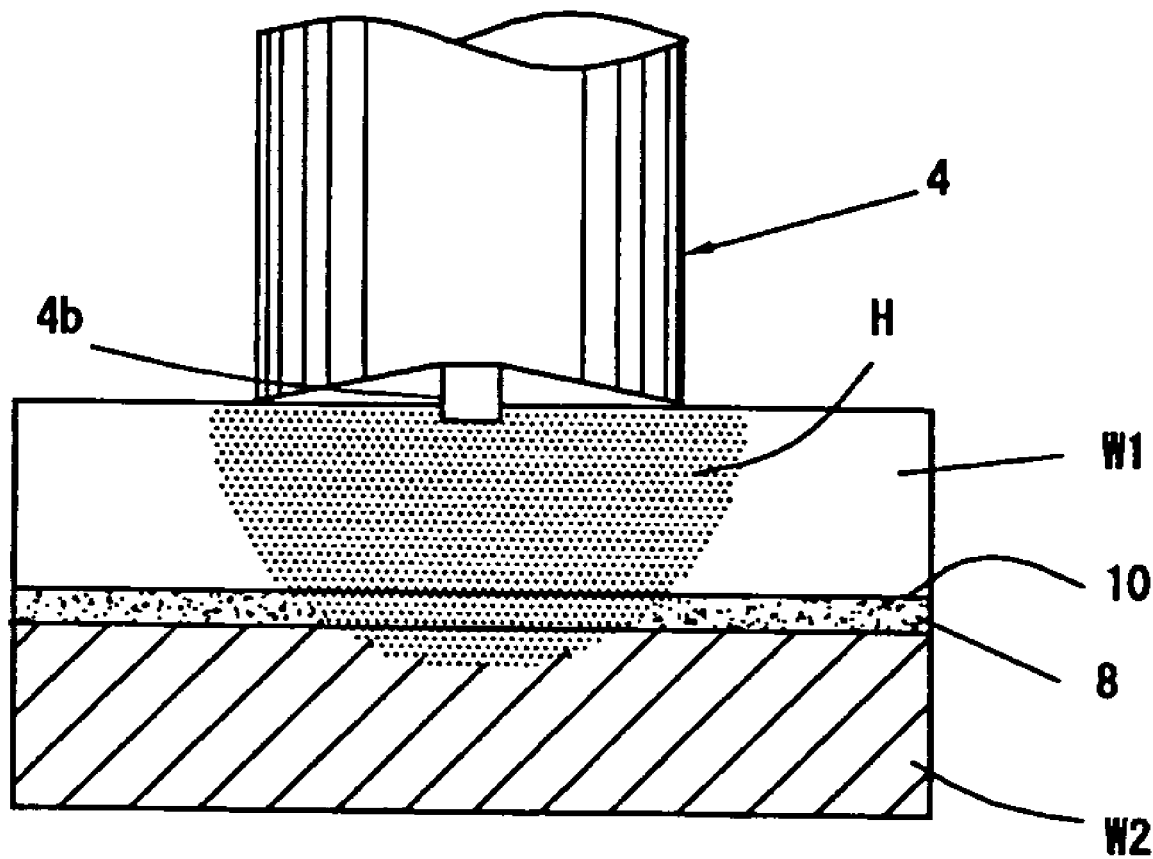
FIG. 8 is a sectional view illustrating a joining portion at a point (a) in FIG. 7.
Figure 9:
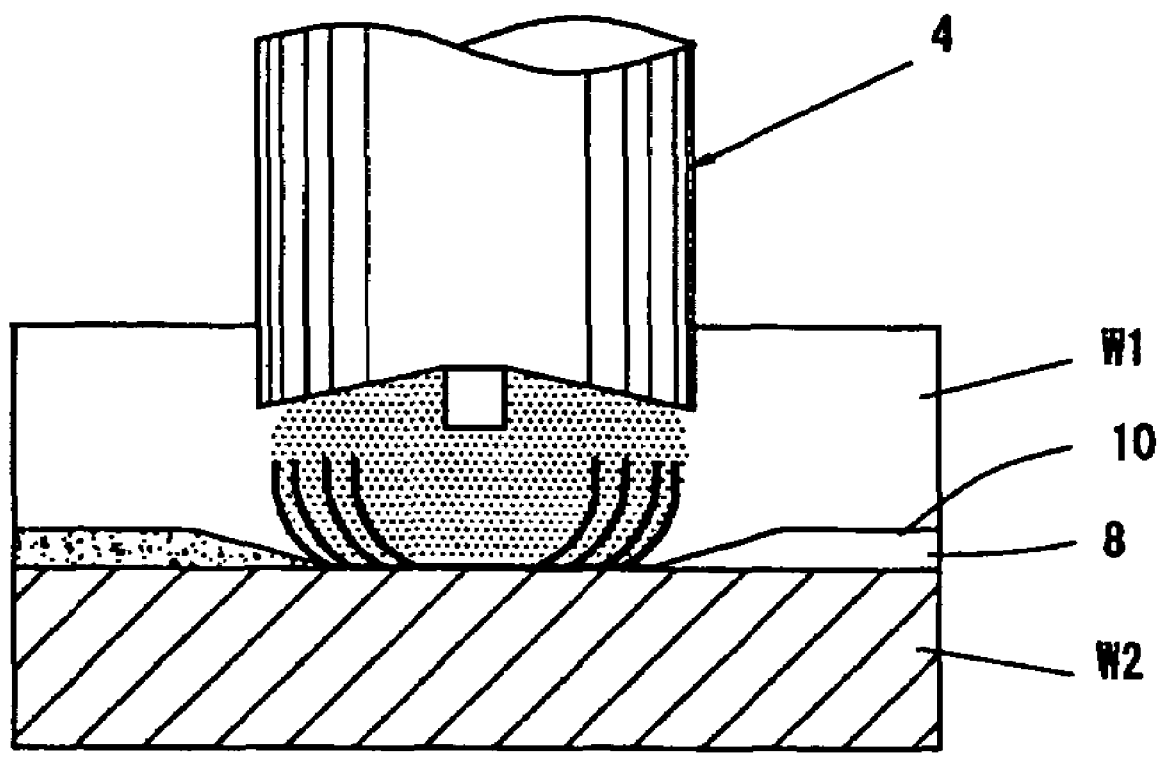
FIG. 9 is a sectional view illustrating the joining portion at a point (b) in FIG. 7.
Figure 10:
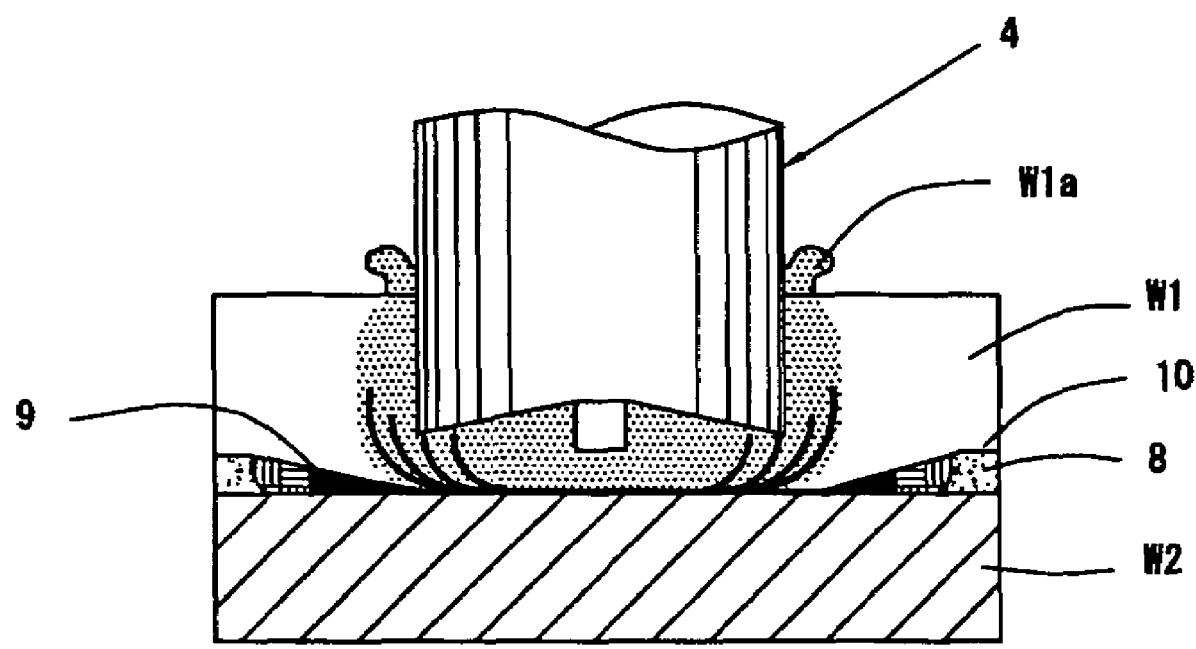
FIG. 10 is a sectional view illustrating the joining portion at a point (c) in FIG. 7.

Next, a change of the pressing force and a change of the joining portion thereby according to the present joining method will be described referring to FIGS. 7 through 10. FIG. 7 is a graph illustrating the change in the pressing force by the rotating tool 4 with respect to time. FIGS. 8 through 10 are sectional views respectively illustrating the joining portions at points (a) through (c) in FIG. 7.

As apparent from the graph of FIG. 7, the pressing force changes substantially in two stages. The pressing force is mainlined at about 100 kgf (the first pressing force) in the initial stage, and then increased to about 300 kgf (the second pressing force) in the subsequent terminal stage. The maintained state at the 100 kgf of pressing force corresponds to the step S5 in the above-described flowchart, while the increased state to the 300 kgf of pressing force corresponds to the step S6 and S7.

FIG. 8 illustrates the joining portion at the point (a) in FIG. 7. An illustrated stage herein is a stage where the pin portion 4b of the rotating tool 4 contacts the aluminum plate W1 (see step S4), in which the frictional heat H is generated via an end contacting between the pin portion 4b and the aluminum plate W1, and the zinc plating layer 8 and the aluminum plate W1 start to be softened thereby.

FIG. 9 illustrates the joining portion at the point (b) in FIG. 7. In this stage, the aluminum plate W1 including its outer surface is softened to a relatively larger extent by the frictional heat H generated under the rotation of the rotating tool 4 having the first pressing force being maintained for a specified period of time, and accordingly the pin portion 4b and the shoulder portion 4c of the rotating tool 4 go into the aluminum plate W1. Accordingly, the rotational center of the rotating tool 4 can be stabilized properly even if the pin portion 4b is short, thereby providing the proper centering of the rotating tool 4.

FIG. 10 illustrates the joining portion at the point (c) in FIG. 7. In this stage, the rotating tool 4 goes into the aluminum plate W1 under the second pressing force, and the plastic flow of the aluminum plate W1 starts (see step S6). Herein, shearing of aluminum material occurs and the diffusion of the zinc plating layer 8 also occurs.

The rotating tool 4 going into under the second pressing force causes the exposure of the new uncovered surface of the aluminum material.

In this sage with the maintained second pressing force, the rotating tool 4 goes into the aluminum plate W1 further to the vicinity of the joining face 10, and both new uncovered surfaces of the aluminum and steel plates W1 and W2 come to contact directly to each other (see FIG. 7). Accordingly, the both plates W1 and W2 are firmly jointed in the solid state.

Herein, part of aluminum material may be pushed out on the surface of the aluminum plate W1 by the rotating tool 4 going down, which is denoted by reference character W1a.

Figure 11A:
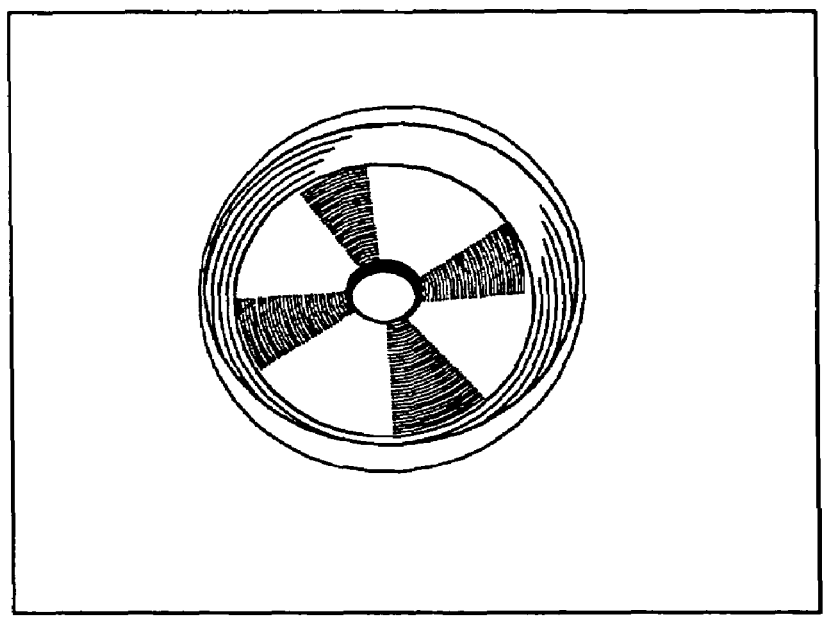
FIG. 11A is an exterior view of a joining spot according to the embodiment.

FIG. 11A illustrates an exterior view of a joining spot at the joining portion which has been formed via the above-described joining method. It is apparent that this joint spot of FIG. 11A provides a better outer view than that illustrated in FIG. 11B formed by the conventional joining method in which the pressing force is applied substantially at one time.

Namely, a single substantially-circular recess appears as the joining spot in FIG. 11A. However, the outer view of the joining spot in FIG. 11B does not show such a clearly-viewed circular recess.

Figure 11B:
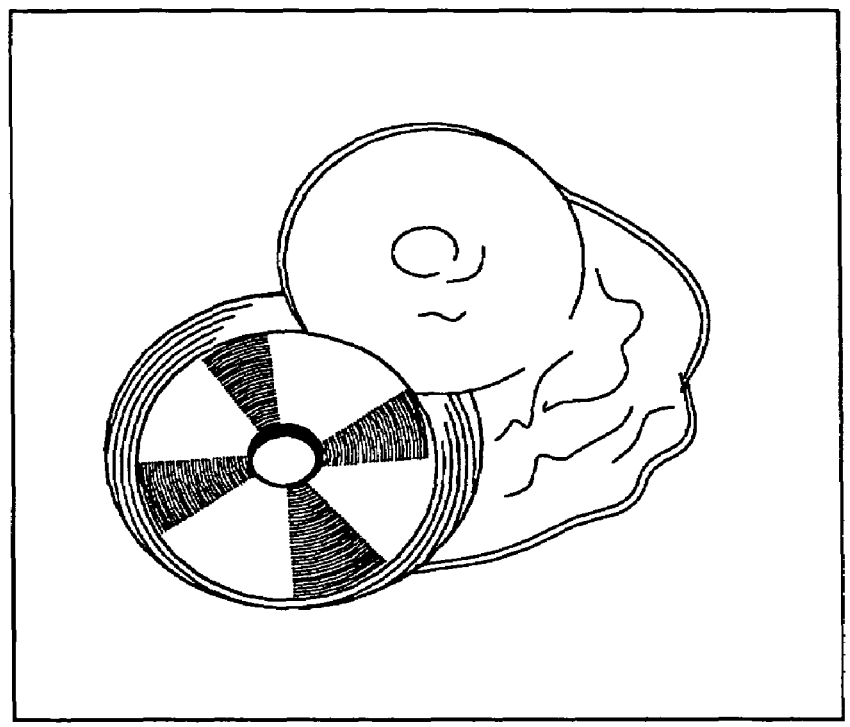
FIG. 11B is an exterior view of a conventional joining spot.

The joining spot with a poor appearance as illustrated in FIG. 11B may deteriorate the marketability and the joining strength. Further, since the aluminum materials are accumulated on the tip of the rotating tool 4, the productivity may be deteriorated. Meanwhile, the joining method of the present invention can provide the proper centering of the rotating tool 4 surely. As a result, the proper appearance as illustrated in FIG. 11A can be obtained and any other problems described above can be avoided.

Next, the experiment which was conducted to figure out a proper pressing way in the joining method with the two-stage pressing according to the present embodiment will be described referring to a data table in FIG. 12. Herein, the rotating tool 4 having the same dimensions as the above (i.e., the 10.6 mm of shoulder diameter d1, the 2.4 mm of diameter d2 of the pin portion, the 0.4 mm of length h of the pin portion, and the 5 degree of slant angle α of the concave) was used. The units of rotational speed, pressing force and pressing period of time (s) are rpm, kN and second, respectively.

First, the upper aluminum plate W1 of 1.0 mm thickness and the lower zinc-plating steel plate W2 were used as joining metal members, and eleven different joining conditions were applied in joining these metal members.

Herein, the experimental data of FIG. 12 shows that the joining having the large pressing force of the first stage and the small pressing force of the second stage could not join them properly with some aluminum materials accumulated on the rotating tool 4, as shown by the sample No. 1 and No. 2. This seems to be because the large pressing force was applied to the upper aluminum plate before the aluminum material had been softened sufficiently, so that the plastic flow of aluminum was prevented and the aluminum material was destroyed by the rotating tool 4.

Also, the experimental data shows that the joining having the small pressing force of the first stage and the large pressing force of the second stage could provide a proper joining regardless of the pressing period of time. This seems to show that the pressing force control could primarily influence the joining results.

Herein, there was a difference in the rotational speed of the first stage between the sample No. 1 and No. 2. The sample No. 2 with the greater rotational speed shows that the joining was conducted to a certain extent. This seems to be because that the greater frictional heat could be generated, so that the aluminum material was softened promptly and the plastic flow of aluminum was carried out to a certain extent thereby.

Next, the experimental data of FIG. 13 shows experimental results of using the metal members with a decreased thickness, i.e., the upper aluminum plate W1 of 0.8 mm thickness and the lower zinc-plating steel plate W2 of 0.8 mm thickness. Herein, the length of the pin portion 4b was also reduced to 0.2 mm according to the decreased thickness of the plates.

In this experiment, the pressing force of the rotating tool 4 was changed in three stages. This seems to be because thinner metal members may not be joined properly as the aluminum materials tend to be accumulated on the rotating tool 4. Namely, the initial pressing force is required to be small (0.49 kN in the experimental data) in order to avoid the accumulation of aluminum material. Meanwhile, a certain degree of pressing force (0.98 kN in the experimental data) should be necessary to induce the plastic flow of aluminum and destroy the oxidation layer on the aluminum plate. However, if the pressing force changes too quick, it may cause a rapid plastic flow of aluminum and the proper joining may not obtained. Accordingly, there was provided a middle pressing force (the second stage) between the initial pressing force and the pressing force for plastic flow. As a result, even metal members with such a thin thickness could be joined surely in the solid state.

Hereinafter, function and effects of the present embodiment constituted as above will be described.

According to the present embodiment, as described above, there is provided the spot joining method of metal members comprising the steps of lapping the aluminum plate W1 and the steel plate W2 having the higher melting point than that of the aluminum plate W1, placing the rotating tool 4 under the rotation on the outer surface of the aluminum plate W1 by making the rotating tool 4 approach in the rotational axis direction, the rotating tool 4 comprising the pin portion 4b projecting outward at the center thereof, pressing the rotational tool 4 against the aluminum plate W1 with the pressing force, whereby the aluminum plate W1 can be softened and made in the plastic flow state by the frictional heat generated by the rotation of the rotating tool 4 and spot faces of the aluminum plate W1 and the second steel plate W2 are joined thereby, wherein the step of pressing the rotational tool 4 against the aluminum plate W1 comprises at least the initial step of pressing the rotational tool 4 with the relatively small pressing force enough to generate the frictional heat which can soften at least the outer surface of the aluminum plate W1, and the subsequent step of pressing the rotational tool 4 with the relatively large pressing force enough to make the aluminum plate W1 in the plastic flow state so that the spot faces 10 of the plates can be joined eventually.

Accordingly, the rotating tool 4 is moved down into near the joining face 10 with its pressing force being changed in stages, and the frictional head H makes the aluminum plate W1 in the plastic flow state. The aluminum plate W1 and the steel plate W2 are joined thereby.

Namely, since the pressing force of the rotational tool 4 is controlled at the relatively small one in the initial joining stage, at least the outer surface of the aluminum plate W1 can be softened by the frictional heat H and the rotational center of the rotating tool 4 can be stabilized properly thereby. Meanwhile, the pressing force of the rotational tool 4 is increased in the subsequent joining stage, the aluminum plate W1 can be made in the plastic flow state so that the plates W1 and W2 can be joined eventually.

Accordingly, the stabilization of the rotating center of the rotating tool due to the reduced pressing force in the initial stage of joining can provide a stable joining position even if the pin portion 4b of the rotating tool 4 is short. Thus, according to the spot joining method of different kinds of metal members of the present embodiment, even if the pin portion 4b of the rotating tool 4 is short, the joining position can be stabilized, the accumulation of aluminum materials on the rotating tool 4 can be prevented, the deterioration of outer view can be prevented, and the sufficient joining strength can be obtained.

Herein, the pressing force changed in stages may have two stages, three stages or even more. Also, force differences of the changed pressing force may be set appropriately in consideration of providing properly the above-described stable rotational center of the rotating tool and plastic-flow-state joining of metal members. Also, the joining metal members are not limited to the aluminum and steel, and any other metal members having different pelting points, such magnesium alloy and steel.

According to the present embodiment, the rotating tool 4 further comprises the ring-shaped concave 4d which is formed at the shoulder portion 4c around the pin portion 4b.

Accordingly, the pressing force being increased in stages is applied by the rotating tool 4 with the ring-shaped concave 4d formed at the shoulder portion 4c, and the aluminum plate W1 and the steel plate W2 are joined thereby.

Thus, the aluminum plate W1 softened by the frictional heat generated at the pin portion 4b is apt to remain in the concave 4d formed at the shoulder portion 4c in the plastic flow state, and it can be properly prevented from flowing out from the joining portion. Therefore, the aluminum plate W1 can be pressed surely even though the pressing force is increased in stages. As a result, the aluminum and steel plates W1 and W2 can be joined properly and surely.

Also, according to the present embodiment, the above-described ring-shaped concave 4d comprises the slant bottom face such that the depth becomes deeper gradually inwardly.

Accordingly, the aluminum plate W1 in the plastic flow state is directed toward the center of the rotating tool 4 by the pressing force. Thus, the pressing force against the aluminum plate W1 can be surely increased. As a result, the aluminum and steel plates W1 and W2 can be joined properly and surely.

Further, according to the present embodiment, the above-described step of pressing the rotational tool 4 against the aluminum plate W1 into the vicinity of the joining face 10 is substantially comprised of two steps of the above-described initial and subsequent steps.

Accordingly, the pressing force increased in stages has two stages, i.e., the first stage where at least the outer surface of the aluminum plate W1 is softened by the frictional heat, and the second stage where the aluminum plate W1 is made in the plastic flow state Thus, these two stages can be provided securely. Accordingly, the above-described stable rotational center of the rotating tool 4 and proper plastic-flow-state joining of metal members can be attained securely. As a result, the aluminum and steel plates W1 and W2 can be joined properly and surely.

Also, according to the present embodiment, the both joining faces 10 of the aluminum and steel plates W1 and W2 are joined in the solid state.

Accordingly, the solid state joining of the aluminum plate and the steel plate with the short pin portion 4b can be attained surely.

Further, according to the present embodiment, there is provided the spot joining apparatus A of metal members, in which the aluminum plate W1 and the steel plate W2 are joined by at least partly lapping the plates and by use of the frictional heat H generated by the rotation of the rotating tool 4 having the pin portion 4b projecting outward at the center, the melting point of the steel plate W2 being higher than that of the aluminum plate W1, comprising the rotating axis motor 12 to apply the rotation to the rotating tool 4, the pressing axis motor 11 to apply the pressing force to the rotating tool 4 in the rotational axis direction, and the pressing-force control device (the control unit 3) to change the pressing force of the pressing axis motor 11 from the initial pressing force which is relatively small enough to generate the frictional heat which can soften at least the outer surface of the aluminum plate W1 to the subsequent pressing force which is relatively large enough to make the aluminum plate W1 in the plastic flow state so that the aluminum and steel plates can be joined.

Accordingly, the rotation and pressing force are applied to the rotating tool 4 via the rotating axis motor 12 and the pressing axis motor 11, the pressing force of the pressing axis motor 11 is increased in stages via the pressing-force control device (the control unit 3), and the rotating tool 4 is moved down into the aluminum plate W1 to the vicinity of the joining face 10 thereby.

Thus, by increasing the pressing force in stages, in the initial joining stage, at least the outer surface of the aluminum plate W1 can be softened by the frictional heat and the rotational center of the rotating tool 4 can be stabilized properly with the initial pressing force which is relatively small. Meanwhile, in the subsequent joining stage, the aluminum plate W1 can be made properly in the plastic flow state with the increased pressing force so that the both plates can be joined eventually.

According to the spot joining apparatus A of different kinds of metal members of the present embodiment, even if the pin portion 4b of the rotating tool 4 is short, the joining position can be stabilized, the accumulation of aluminum materials on the rotating tool 4 can be prevented, the deterioration of outer view can be prevented, and the sufficient joining strength can be obtained.

Also, according to the present embodiment, the rotating tool 4 comprises the ring-shaped concave 4d formed at the shoulder portion 4c around the pin portion 4b in the above-described spot joining apparatus A.

Accordingly, the pressing force being increased in stages is applied by the rotating tool 4 with the ring-shaped concave 4d formed at the shoulder portion 4c, and the aluminum plate W1 and the steel plate W2 are joined thereby.

Thus, the aluminum plate W1 softened by the frictional heat generated at the pin portion 4b is apt to remain within the concave 4d formed at the shoulder portion 4c in the plastic flow state, and it can be properly prevented from flowing out from the joining portion. Therefore, the aluminum plate W1 can be pressed surely even though the pressing force is increased in stages. As a result, the aluminum and steel plates W1 and W2 can be joined properly and surely.

Also, according to the present embodiment, the above-described ring-shaped concave 4d comprises the slant bottom face such that the depth becomes deeper gradually inwardly.

Accordingly, the aluminum plate W1 in the plastic flow state is directed toward the center of the rotating tool 4 by the pressing force. Thus, the pressing force against the aluminum plate W1 can be surely increased. As a result, the aluminum and steel plates W1 and W2 can be joined properly and surely.

In the correspondence between constitution of the present invention and the present embodiment, the first metal member corresponds to the aluminum plate W1, the second metal member corresponds to the steel plate W2, the rotation applying device corresponds to the rotating axis motor 12, the pressure applying device corresponds to the pressing axis motor 11. However, the present invention should not be limited to the above-described embodiment, but any other modifications and improvements may be applied within the scope of a sprit of the present invention.

What is claimed is:

1. A spot joining method of metal members, in which different kinds of metal members are joined by at least partly lapping the metal members, comprising the steps of:

lapping a first metal member and a second metal member, a melting point of the second metal member being higher than that of the first metal member, a metal film being formed on a joining face of the second metal member;

placing a rotating tool under a rotation on an outer surface of the first metal member by making the rotating tool approach in a rotational axis direction, the rotating tool comprising a cylindrical body portion and a cylindrical pin portion that projects from a tip of the body portion, the body portion having a concave portion at a tip surface thereof, the concave portion comprising a slant bottom face such that a depth becomes deeper gradually inwardly, the pin portion being located at a center of the concave portion to project from the bottom face of the concave portion beyond the tip of the body portion, an axis of the pin portion being located on a rotational axis of the body portion;

pressing the rotating tool against the first metal member with a pressing force in such a manner that the rotating tool goes into the first metal member without reaching the second metal member, whereby only the first metal member can be softened and made in a plastic flow state by a frictional heat generated by the rotation of the rotating tool and spot faces of the first and second metal members are joined thereby in a solid state, wherein said step of pressing the rotating tool against the first metal member comprises at least an initial step of pressing the rotating tool with a relatively small pressing force enough to generate a frictional heat which can soften the outer surface of the first metal member to provide proper centering of the rotating tool by the pin portion and stabilize a rotational center of the rotating tool, and a subsequent step of pressing the rotating tool with a relatively large pressing force that is greater than said relatively small pressing force and enough to make the first metal member in the plastic flow state and push away outwardly said metal film softened by the frictional heat generated by the rotation of the rotating tool so that respective new uncovered surfaces of said first and second metal members can directly contact each other, whereby the spot faces of the first and second metal members can be joined in the solid state substantially without said metal film and with a direct contact of the new uncovered surfaces of the first and second metal members.

2. The spot joining method of metal members of claim 1, wherein said step of pressing the rotating tool against the first metal member is substantially comprised of two steps of said initial and subsequent steps.

3. The spot joining method of metal members of claim 1, wherein said first metal member is an aluminum plate and the second metal member is a steel plate, whereby spot faces of the both plates are joined in a solid state.

4. The spot joining method of metal members of claim 1, wherein said pressing force is substantially changed stepwise from said relatively small pressing force to said relatively large pressing force.

* * * * *